United States Patent [19]
Croughwell

[11] Patent Number: 5,610,497
[45] Date of Patent: Mar. 11, 1997

[54] METHOD AND APPARATUS FOR PROVIDING CONTINUOUS POWER TO A BATTERY POWERED DEVICE DURING BATTERY TRANSFER

[75] Inventor: William J. Croughwell, Durham, N.C.

[73] Assignee: Ericsson Inc., Research Triangle Park, N.C.

[21] Appl. No.: 348,055

[22] Filed: Dec. 1, 1994

[51] Int. Cl.$^6$ .................................................. H02J 7/00
[52] U.S. Cl. ................................................. 320/15; 320/2
[58] Field of Search ................................. 320/15, 2

[56] References Cited

U.S. PATENT DOCUMENTS

| | | | |
|---|---|---|---|
| 4,084,123 | 4/1978 | Lineback et al. | 320/2 |
| 4,694,237 | 9/1987 | Hanson | 320/15 X |
| 4,829,224 | 5/1989 | Gandelman et al. | |
| 5,036,532 | 7/1991 | Metroka et al. | |
| 5,136,229 | 8/1992 | Galvin. | |
| 5,148,042 | 9/1992 | Nakazoe | 307/65 |
| 5,162,719 | 11/1992 | Tomura et al. | |
| 5,189,358 | 2/1993 | Tomura et al. | |
| 5,200,685 | 4/1993 | Sakamoto | 320/2 |
| 5,254,927 | 10/1993 | Chiang. | |
| 5,300,874 | 4/1994 | Shimamoto et al. | 320/15 |
| 5,309,031 | 5/1994 | Stewart et al. | 307/66 |
| 5,422,558 | 6/1995 | Stewart | 320/5 |
| 5,477,123 | 12/1995 | Allen et al. | 320/2 |
| 5,485,073 | 1/1996 | Kasashima et al. | 320/15 |

FOREIGN PATENT DOCUMENTS

| | | |
|---|---|---|
| 0434905A2 | 7/1991 | European Pat. Off. . |
| 4-105524 | 4/1992 | Japan . |

OTHER PUBLICATIONS

International Search Report, PCT/US95/15282, May 20, 1996.

*Primary Examiner*—Peter S. Wong
*Assistant Examiner*—K. Shin
*Attorney, Agent, or Firm*—Bell, Seltzer, Park & Gibson

[57] ABSTRACT

A battery transfer apparatus and method according to the present invention provides continuous battery power to a battery powered device while changing batteries. Battery power is provided to the battery powered device from a charged battery while a nearly discharged battery is removed from the battery powered device. Battery power is also provided to the battery powered device from the nearly discharged battery while the charged battery is inserted into the battery powered device. The nearly discharged battery may be prevented from draining power from the charged battery during the transfer operation. A battery charger and battery condition indicator may also be included.

19 Claims, 3 Drawing Sheets

METHOD AND APPARATUS FOR PROVIDING CONTINUOUS POWER TO A BATTERY POWERED DEVICE DURING BATTERY TRANSFER

FIELD OF THE INVENTION

This invention relates to the field of portable electronic devices and more particularly to the field of battery powered electronic devices.

BACKGROUND OF THE INVENTION

Many modern electronic devices have been adapted for portable use by miniaturizing the electronic components and by providing a battery power source. Examples include laptop computers, "Walkman"® type tape and compact disk players, and cellular phones. The use of these devices may be limited, however, by the life of the battery power source. Accordingly, there have been attempts in the art to reduce the inconvenience resulting from the need to change batteries.

The use of an external battery with a portable notebook type computer is disclosed in U.S. Pat. No. 5,200,685 to Sakamoto entitled "Adapter For External Battery and Battery System." In this patent, the internal battery may be removed while power is supplied from the external battery. Accordingly, the internal batteries may be exchanged while the external battery is connected to the personal computer. This operation may require, however, that extra internal batteries as well as the external battery be carried.

Another approach is disclosed in U.S. Pat. No. 5,036,532 to Metroka et el. entitled "Portable Telephone With Power Source/Mode Change During Calls." This patent discloses a cellular portable telephone that accommodates a power source change between the portable's battery and another battery during a cellular telephone call. If another battery is plugged into the cellular telephone within four seconds after the first battery is removed, the telephone may re-enter the cellular telephone call that was in process when the discharged battery was removed. If the charged battery is not plugged into the telephone within the four second time period, however, the previous cellular telephone call will not be reentered. Accordingly, quick action may be required in order to change batteries during a call without interrupting the call.

Notwithstanding the above mentioned references, there exists a need in the art for an apparatus and method for changing a nearly discharged battery in a portable electronic device without interrupting service of the device. In particular, there exists a need for an apparatus and method for changing the battery of a cellular telephone during a call without interrupting the call or requiring quick action.

SUMMARY OF THE INVENTION

It is therefore an object of the present invention to provide an apparatus and method for supplying continuous power to an electronic device while changing the batteries.

It is another object of the present invention to provide an apparatus and method for changing batteries of a cellular phone without interrupting a call in progress.

These and other objects of the present invention are provided by recognizing that a nearly discharged battery can be used to power the device while a fresh or charged battery is being installed. In particular, a preferred embodiment of the present invention is an apparatus for providing continuous battery power to a battery powered device including means for providing battery power to the battery powered device from a charged battery while a nearly discharged battery is removed from the battery powered device. The apparatus also includes means for providing battery power to the battery powered device from the nearly discharged battery while the charged battery is inserted into the battery powered device. Accordingly, continuous power is delivered to the battery powered device allowing uninterrupted operation.

Means for preventing the nearly discharged battery from draining power from the charged battery during the periods when both batteries are connected may be included in the apparatus. This feature can maximize the life of the charged battery. The preventing means may comprise a diode.

The apparatus may also include charging means for charging at least one battery. Accordingly, after being used to change batteries, the apparatus may be used to charge the nearly discharged battery. The charging means may comprise a trickle mode battery charging circuit and may also comprise a plug for connecting the charging means to an external source of power.

In addition, indicator means for indicating a battery condition may be included. Accordingly, the apparatus can indicate the charge of the battery being used to operate the device and the charge of the charged battery. The user can then use this information to change batteries at the optimum time so as to maximize the use of available batteries.

Furthermore, the apparatus preferably includes polarity means for insuring that battery power having the correct polarity is provided to the battery powered device. This feature can prevent the application of reverse polarity to the battery powered device which could interrupt the operation of the device.

An apparatus for providing continuous battery power to a battery powered device preferably includes a battery interface comprising connector means for receiving a charged battery to be installed in the electronic device and for receiving a nearly discharged battery to be removed from the electronic device. This apparatus also includes continuous power transfer means electrically connected to the battery interface. The transfer means provides electrical power from the charged battery to the battery powered electronic device while the nearly discharged battery is removed from the electronic device. The transfer means also provides electrical power from the nearly discharged battery to the electronic device while the charged battery is installed in the electronic device.

The battery interface may include orientation means for insuring that each battery is received in a correct orientation. In addition, the transfer means may include keying means for insuring a correct orientation of the power transfer means with respect to the battery powered device. Accordingly, these features provide that electrical power applied from the apparatus to the battery powered device is applied in the correct polarity.

A method for removing a nearly discharged battery from a battery powered device and installing a charged battery in the battery powered device without interrupting battery power to the battery powered device is also provided. This method includes the steps of providing power from the charged battery to the battery powered device while removing the nearly discharged battery from the battery powered device, and providing power from the nearly discharged battery to the battery powered device while installing the charged battery in the battery powered device. This method may also include the steps of charging the nearly discharged battery, and indicating a condition of a battery.

The apparatus and method of the present invention allow the user of a battery powered device to change batteries without interrupting the operation of the device. This change of batteries may be accomplished with the apparatus and a spare battery. There is no need for a separate power supply or a third battery. By indicating a battery condition, the apparatus may allow the user to change batteries at the most opportune times so as to maximize the use of available batteries. By including charging means, the apparatus may be used to charge the nearly discharged battery for later use. Because a battery charger is needed anyway, this combination will eliminate the creation of an additional piece of equipment. Furthermore, the apparatus may be relatively small so that it does not add significant bulk or weight to the spare battery which can be carried in the apparatus. If the battery powered device is a cellular phone, the apparatus allows the user to reliably maintain a conversation while changing batteries.

DETAILED DESCRIPTION OF THE PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
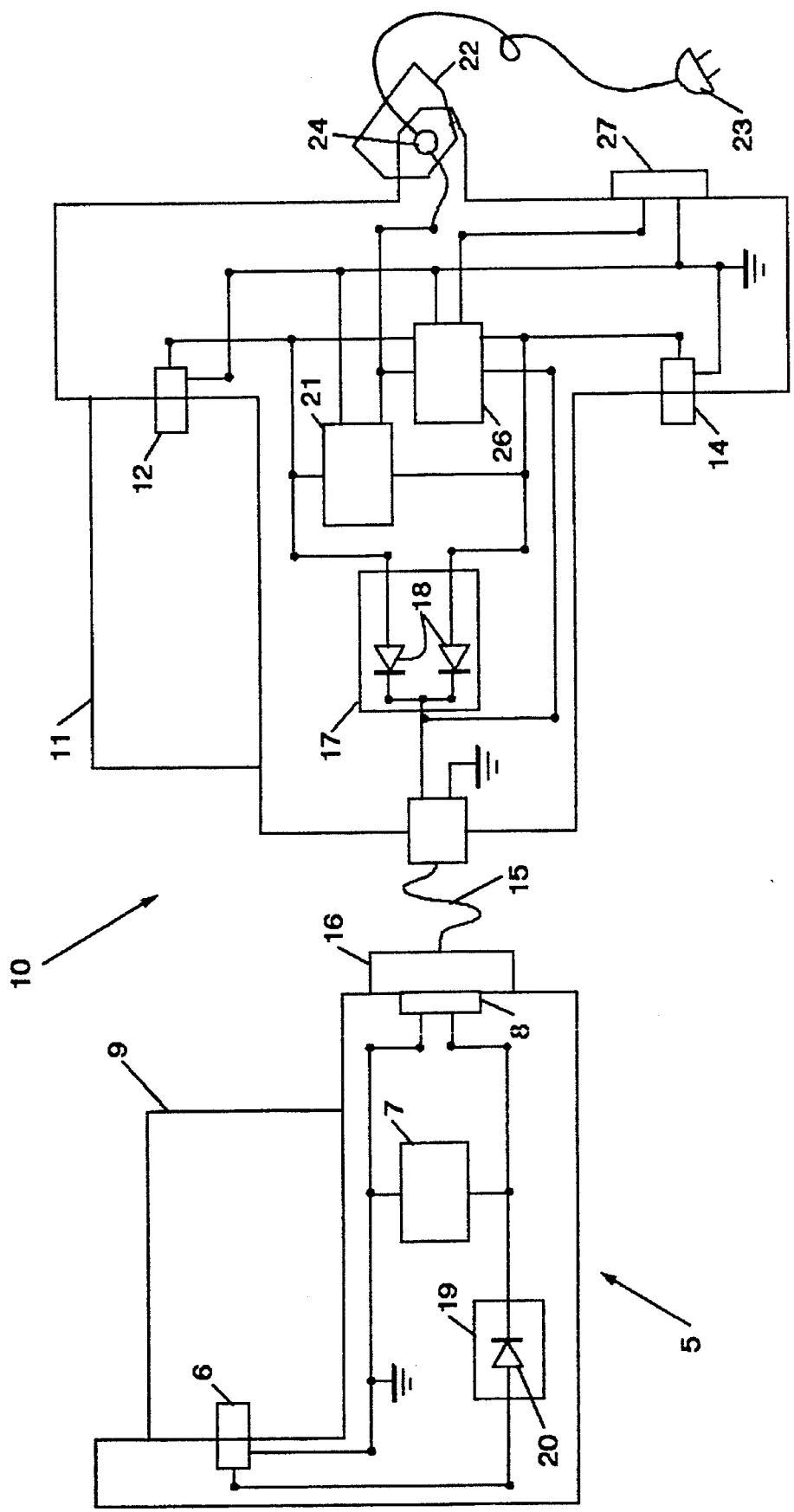
FIG. 1 is a schematic diagram of a battery transfer apparatus with a charged battery according to the present invention connected to a cellular telephone with a nearly discharged battery.
Figure 2:
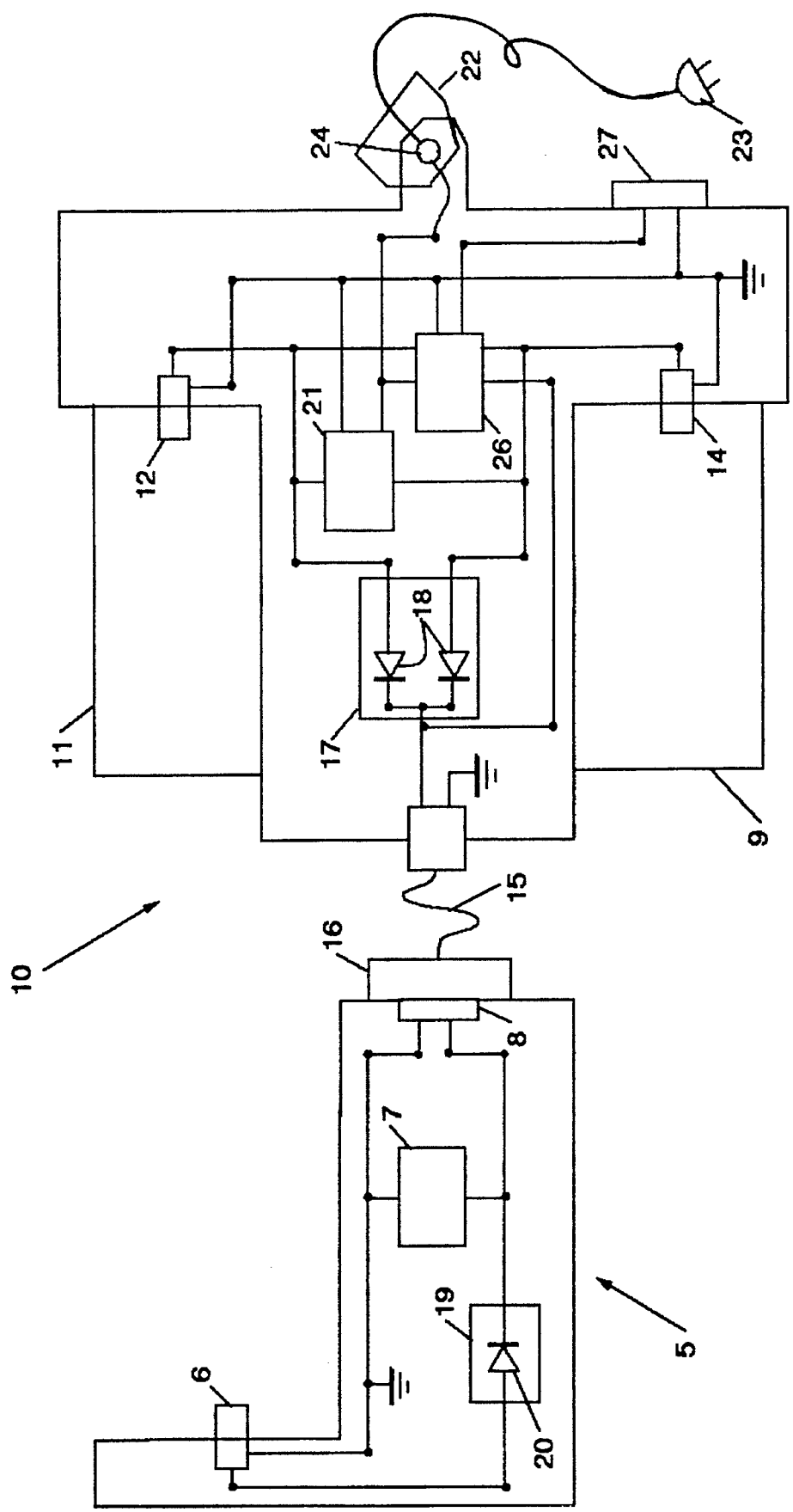
FIG. 2 is a schematic diagram of a battery transfer apparatus with both a charged battery and a nearly discharged battery according to the present invention connected to a cellular telephone.
Figure 3:
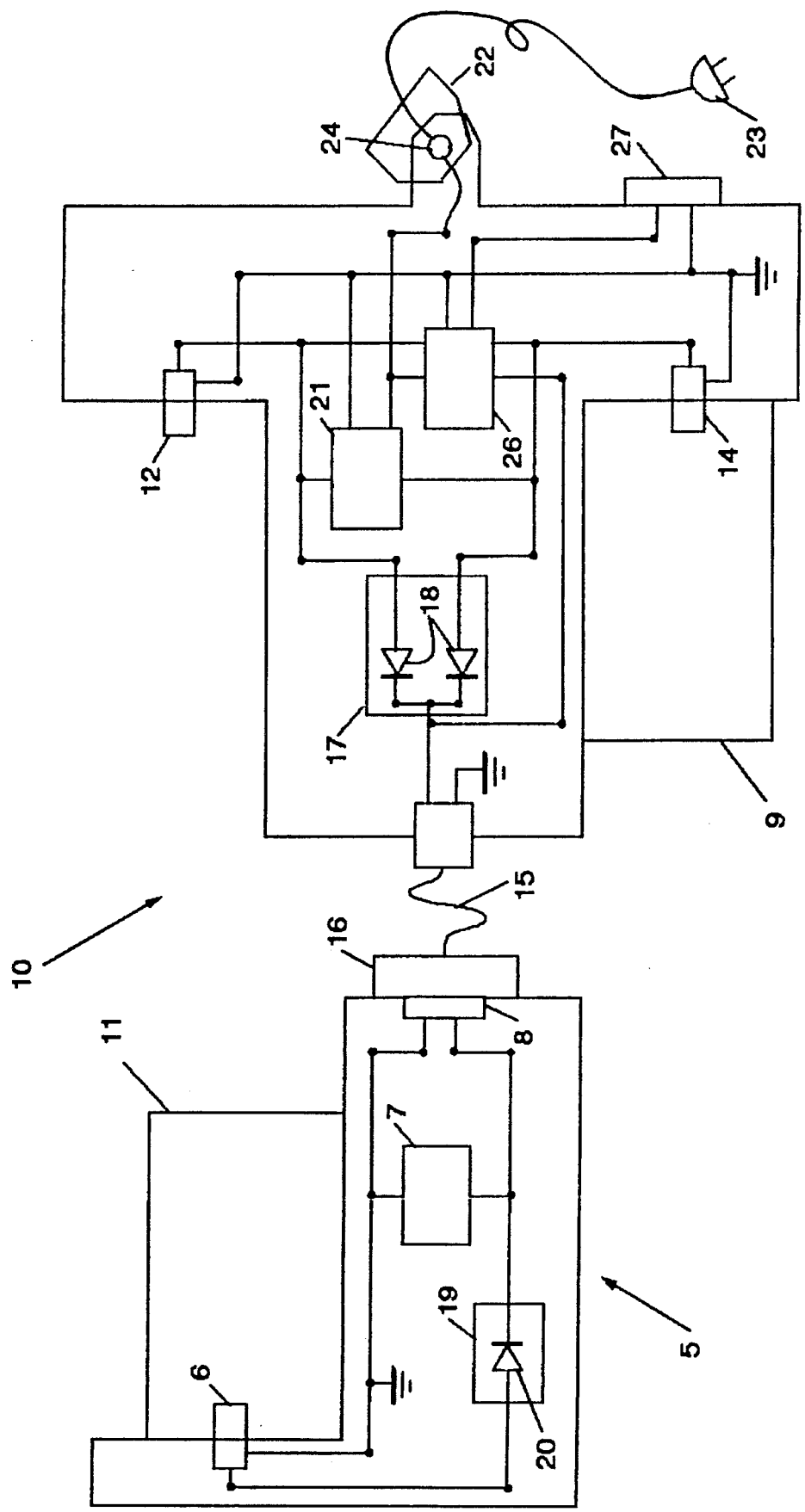
FIG. 3 is a schematic diagram of a battery transfer apparatus with a nearly discharged battery according to the present invention connected to a cellular phone with a charged battery.

Many electronic devices such as laptop computers, "Walkman"® type tape and compact disk players, and cellular phones have been adapted for portable use by providing a battery power supply. In a preferred embodiment of the present invention a battery transfer apparatus 10 is used to transfer batteries to an electronic device such as a cellular phone 5 without interrupting operation of the phone, as shown in FIGS. 1–3. While a cellular phone is used throughout this specification for the purposes of discussion, it will be understood by those having skill in the art that the battery transfer apparatus may be adapted for use with other battery powered electronic devices.

The cellular phone 5 shown schematically in FIGS. 1–3 includes a battery connector 6; an electrical load 7 including transceiver, controller, and other circuits of the phone; and an adapter 8 for receiving power from the battery transfer apparatus 10. The adapter 8 may be an external power connector which receives the output of a transformer which is plugged into a wall outlet. As shown in FIGS. 1–3, the adapter 8 may be a female connector for receiving a male system connector 16 of the battery transfer apparatus 10. In normal operation, the electrical load 7 of the cellular phone 5 is powered by a battery 9. The battery may be a 900 mA-hour or 400 mA-hour battery as both are commonly used in pocket cellular phones. After extended use, however, the battery will lose its charge. Accordingly, it will become necessary to change the battery.

When using a cellular phone 5 as shown in FIG. 1, the battery 9 may reach a nearly discharged state. In this condition, the nearly discharged battery 9 will support operation of the device for only a limited period of time. In its nearly discharged state, the battery 9 preferably has just enough charge left to power the load 7 during the battery transfer process.

One embodiment of the present invention provides a battery transfer apparatus 10 which allows the transfer of batteries without interrupting the operation of the cellular phone. This may be particularly advantageous if the battery must be changed during a telephone conversation or during a period of time when the user is expecting a call. The user may be informed of the need to change batteries by a warning signal on the cellular phone 5 such as a tone or light (not shown).

When the user becomes aware of the need to change batteries, the charged battery 11 is placed in the battery transfer apparatus 10 making a mechanical and electrical connection at connector 12. As illustrated in FIGS. 1–3 the battery transfer apparatus 10 of the present invention includes a battery interface with connectors 12 and 14 for receiving respective batteries in a mechanical and electrical connection. While the interface may include any number of connectors greater than two, the interface preferably includes two connectors. The interface is preferably symmetric, and while the charged battery 11 is shown connected at connector 12, the charged battery can preferably be connected at either 12 or 14.

The battery transfer apparatus 10 is then connected to the cellular phone 5 by continuous power transfer means including elements such as a wire 15 and a system connector 16 which attaches to the phone. The battery transfer apparatus 10 preferably includes means for insuring that battery power having the correct polarity is provided to the cellular phone 5. This means may include orientation means for insuring that the battery 11 fits either connector 12 or 14 in a predetermined orientation. The orientation means preferably comprises a mechanical coupling between the battery and the connector as would be readily understood by one having skill in the art. The apparatus 10 also preferably includes keying means to insure the correct orientation between the battery transfer apparatus 10 and the adaptor 8 of the cellular phone 5. This keying means may include a mechanical orienter on the system connector 16 for insuring a correct orientation between the system connector 16 and the adaptor 8 as would be readily understood by one having skill in the art.

When the battery transfer apparatus 10 is loaded with a charged battery 11 and connected to the cellular phone 5, electrical power from the charged battery is available to the cellular phone 5. At this point, both batteries 11 and 9 supply the cellular phone load 7 with electrical power in parallel. The nearly discharged battery 9 may then be removed from the cellular phone 5 and placed in the battery transfer apparatus at connector 14 as shown in FIG. 2. As discussed with regard to the charged battery 11, orientation means are preferably included to insure a correct orientation between the nearly discharged battery 9 and the respective connector 14. Because the nearly discharged battery 9 was not removed before attaching the battery transfer apparatus with charged battery 11, there has been no interruption in the operation of the cellular phone. As discussed above, the connectors 12 and 14 are preferably symmetric allowing the positions of batteries 9 and 11 to be reversed.

With both batteries connected to the battery transfer apparatus, both batteries are again available to power the cellular phone in parallel. In order to prevent the nearly discharged battery 9 from draining power from the charged battery 11, the apparatus preferably includes preventing means such as circuit 17. This circuit may also prevent a battery in the phone 5 from discharging into the apparatus 10. This circuit may include elements such as diodes 18 which prevent either battery from discharging into the other battery. Accordingly, the life of the charged battery may be maximized.

The phone 5 may also include a circuit 19 to prevent charging a battery attached at connector 6. This circuit 19 may also comprise a diode 20. As would be understood by one having skill in the art, the phone may include additional circuitry (not shown) for allowing the nearly discharged battery 9 to be charged by a conventional external charger while in the phone 5.

The charged battery 11 is now removed from the battery transfer apparatus and placed in the cellular phone 5 as shown in FIG. 3 while power is supplied from the nearly discharged battery 9. As discussed above, the nearly discharged battery 9 still has enough charge to power the load 7 for the short period of time during which the charged battery is being transferred.

After connecting the charged battery 11 to the cellular phone 5, the cellular phone can be disconnected from the transfer apparatus and operated independently. Because power is available to the cellular phone throughout the transfer process, the operation of the cellular phone is not interrupted. Accordingly, a telephone conversation can continue or a call can be received during the time that a nearly discharged battery is removed from the phone and a charged battery is installed in the phone.

The battery transfer apparatus 10 may also include charging means for charging at least one battery. As shown in FIGS. 1–3, the apparatus may include a charging circuit 21 such as a conventional trickle mode battery charging circuit. This charging circuit may be connected to an external power source through the power adaptor 22 and adaptor plug 23. The power adaptor and adaptor plug can be configured to receive power from either a 110 V or 220 V AC power source with either a 50 Hz or 60 Hz frequency such as a wall outlet. The adaptor and plug can also be configured to receive power from a 12 V DC power source such as an automobile cigarette lighter. Accordingly, the battery transfer apparatus can be used to charge the nearly discharged battery 9 after being removed from the phone. The apparatus could also be used to charge multiple batteries simultaneously.

The power adaptor 22 and adaptor plug 23 can be permanently or temporarily attached to the apparatus. As shown in FIGS. 1–3, the power adaptor 22 may be temporarily attached to the battery transfer apparatus 10 through a connector 24 which allows the power adaptor 22 to swivel. The connector can also be recessed and/or fixed in the battery transfer apparatus 10.

The apparatus 10 can also include indicator means such as a conventional indicator circuit 26 for determining a condition of a battery. An indicator display 27 electrically connected to the indicator circuit 26 may be used to display the condition of a battery as determined by the indicator circuit. The battery condition can be displayed visually by means such as one or more light emitting diodes, or audibly by means such as a buzzer. For example, the indicator display 27 including light emitting diodes (not shown) and connected to indicator circuit 26 can indicate whether a respective battery at connector 12 or 14 is either adequately charged or nearly discharged.

In one embodiment, upon connecting the battery transfer apparatus 10 to the cellular phone 5, the indicator circuit 26 determines whether the battery in the phone should be switched with the battery in the transfer apparatus based on a comparison of the charges of each battery. The comparison could be made without removing the battery from the phone. This feature would discourage transferring batteries except at the optimum times, and could give an indication of battery condition at any time.

Another embodiment of the present invention is directed to a method for removing a nearly discharged battery from a battery powered device and installing a charged battery in the battery powered device without interrupting the operation of the battery powered device. Referring again to FIGS. 1–3, it may be necessary to replace the battery 9 of a battery powered device such as a cellular phone 5 when the battery 9 reaches a nearly discharged state. This method includes the step of providing power from a charged battery 11 to the cellular phone 5 while removing the nearly discharged battery 9. Power is then provided from the nearly discharged battery 9 to the cellular phone 5 while installing the charged battery 11 in the battery powered device. Accordingly, power is continuously delivered to the cellular phone allowing continuous operation of the phone while changing batteries. The battery transfer apparatus 10 illustrated in FIGS. 1–3 may be used to implement the method of this invention.

Many modifications and other embodiments of the invention will come to one skilled in the art having the benefit of the teachings presented in the foregoing descriptions and the associated drawings. Therefore, it is to be understood that the invention is not to be limited to the specific embodiments disclosed, and that modifications are intended to be included within the scope of the appended claims.

That which is claimed:

1. A battery transfer apparatus for providing continuous battery power to a battery powered device, said apparatus comprising:

a housing separate from the battery powered device;

a battery interface in said housing, said battery interface comprising a first connector which receives a charged battery to be installed in the battery powered device and a second connector which receives a nearly discharged battery to be removed from the battery powered device;

an external connector extending from said housing which provides an electrical connection with the battery powered device; and continuous power transfer means in said housing and electrically connected to said battery interface and said external connector for providing electrical power from the charged battery to the battery powered device while removing the nearly discharged battery from the battery powered device, and for providing electrical power from the nearly discharged battery to the battery powered device while installing the charged battery in the battery powered device.

2. An apparatus according to claim 1 further comprising means for preventing the nearly discharged battery from draining power from the charged battery.

3. An apparatus according to claim 2 wherein said preventing means comprises a diode.

4. An apparatus according to claim 1 further comprising charging means for charging at least one battery.

5. An apparatus according to claim 4 wherein said charging means comprises a trickle mode battery charging circuit.

6. An apparatus according to claim 4 further comprising a plug for connecting said charging means to an external source of power.

7. An apparatus according to claim 1 further comprising indicator means for indicating a battery condition.

8. An apparatus according to claim 1 wherein said battery interface comprises orientation means for insuring that each battery is received in a correct orientation.

9. An apparatus according to claim 1 wherein said continuous power transfer means comprises keying means for insuring a correct orientation of the power transfer means with respect to the battery powered electronic device.

10. A battery transfer apparatus for providing continuous battery power to a battery powered device, said apparatus comprising:

a housing separate from the battery powered device;

an external connector extending from said housing which provides an electrical connection with the battery powered device;

means in said housing for providing battery power to the battery powered device from a charged battery through said external connector while a nearly discharged battery is removed from the battery powered device; and means in said housing for providing battery power to the battery powered device from the nearly discharged battery through said external connector while the charged battery is inserted into the battery powered device.

11. An apparatus according to claim 10 further comprising means for preventing the nearly discharged battery from draining power from the charged battery.

12. An apparatus according to claim 11 wherein said preventing means comprises a diode.

13. An apparatus according to claim 10 further comprising charging means for charging at least one battery.

14. An apparatus according to claim 13 wherein said charging means comprises a trickle mode battery charging circuit.

15. An apparatus according to claim 13 further comprising a plug for connecting said charging means to an external source of power.

16. An apparatus according to claim 10 further comprising indicator means for indicating a battery condition.

17. An apparatus according to claim 10 further comprising polarity means for insuring that battery power having the correct polarity is provided to the battery powered device.

18. An apparatus according to claim 1 further comprising an indicator circuit, in said housing, which compares a charge of a first battery connected to said battery interface with a charge of a second battery in the battery powered device and indicates whether the batteries should be changed.

19. An apparatus according to claim 10 further comprising an indicator circuit, in said housing, which compares a charge of a first battery connected to said battery interface with a charge of a second battery in the battery powered device and indicates whether the batteries should be changed.

* * * * *